US008166524B2

(12) United States Patent
Sentinelli

(10) Patent No.: US 8,166,524 B2
(45) Date of Patent: Apr. 24, 2012

(54) METHOD AND SYSTEM FOR THE AUTHENTICATION OF A USER OF A DATA PROCESSING SYSTEM

(75) Inventor: Mauro Sentinelli, Rome (IT)

(73) Assignee: Telecom Italia S.p.A., Milan (IT)

( * ) Notice: Subject to any disclaimer, the term of this patent is extended or adjusted under 35 U.S.C. 154(b) by 965 days.

(21) Appl. No.: 10/578,087

(22) PCT Filed: Nov. 7, 2003

(86) PCT No.: PCT/EP03/50807
§ 371 (c)(1),
(2), (4) Date: May 3, 2006

(87) PCT Pub. No.: WO2005/045649
PCT Pub. Date: May 19, 2005

(65) Prior Publication Data
US 2008/0295159 A1    Nov. 27, 2008

(51) Int. Cl.
*H04L 29/06* (2006.01)
(52) U.S. Cl. ............. 726/5; 726/2; 726/3; 726/4; 726/6; 726/9; 713/150; 713/155; 713/156; 709/227; 709/228; 340/5.8; 340/5.1; 455/558; 455/557
(58) Field of Classification Search .................. None
See application file for complete search history.

(56) References Cited

U.S. PATENT DOCUMENTS

| | | | |
|---|---|---|---|
| 5,659,595 A * | 8/1997 | Chanu et al. ............... 455/411 |
| 5,668,875 A * | 9/1997 | Brown et al. ............... 380/248 |
| 6,081,727 A * | 6/2000 | Kondo ...................... 455/522 |
| 6,230,002 B1 | 5/2001 | Flodén et al. |
| 6,880,079 B2 * | 4/2005 | Kefford et al. ............. 713/155 |
| 7,562,218 B2 * | 7/2009 | Kirkup et al. ............... 713/168 |
| 7,751,567 B2 * | 7/2010 | Quick et al. ............... 380/264 |
| 2002/0097876 A1 | 7/2002 | Harrison |

(Continued)

FOREIGN PATENT DOCUMENTS

GB    2 380 356 A    4/2003

(Continued)

OTHER PUBLICATIONS

An English translation of the official action of the Japanese Office Action dated Apr. 22, 2008 from the Japanese Patent Office in corresponding Japanese application No. 510422-2005.

*Primary Examiner* — Syed A. Zia
(74) *Attorney, Agent, or Firm* — Finnegan, Henderson, Farabow, Garrett & Dunner, L.L.P.

(57) ABSTRACT

A method of authenticating a user's data processing terminal for granting the data processing terminal access to selected services provided by a data processing system. The method includes performing a first, SIM-based authentication of the user's data processing terminal at an authentication data processing server in the data processing system, by operatively associating with the user's data processing terminal a first subscriber identity module issued to the data processing terminal user, for example, of a type adopted in mobile communication networks for authenticating mobile communication terminals. The authentication of the user's data processing terminal in the data processing system is conditioned to a second authentication, based on identification information provided to the user at a mobile communication terminal through a mobile communication network to which the mobile communication terminal is connected, e.g. in the form of an SMS message.

26 Claims, 6 Drawing Sheets

U.S. PATENT DOCUMENTS

| | | |
|---|---|---|
| 2002/0187808 A1 | 12/2002 | Vallstrom et al. |
| 2003/0051041 A1 | 3/2003 | Kalavade et al. |
| 2003/0055738 A1* | 3/2003 | Alie .................................. 705/26 |
| 2003/0061503 A1 | 3/2003 | Katz et al. |
| 2003/0119482 A1* | 6/2003 | Girard ........................... 455/411 |
| 2003/0177392 A1* | 9/2003 | Hiltgen .......................... 713/201 |
| 2003/0204726 A1* | 10/2003 | Kefford et al. ................. 713/171 |
| 2004/0019564 A1* | 1/2004 | Goldthwaite et al. ........... 705/44 |
| 2004/0117623 A1* | 6/2004 | Kalogridis et al. ............ 713/165 |
| 2004/0139013 A1* | 7/2004 | Barbier et al. ................... 705/40 |
| 2005/0048950 A1* | 3/2005 | Morper ........................... 455/410 |
| 2006/0155653 A1* | 7/2006 | Persokrud et al. ............... 705/67 |
| 2006/0166695 A1* | 7/2006 | Morich ........................ 455/550.1 |
| 2006/0269061 A1* | 11/2006 | Balasubramanian et al. 380/247 |
| 2007/0226805 A1* | 9/2007 | Jeal et al. ........................ 726/27 |
| 2008/0108322 A1* | 5/2008 | Upp ................................ 455/411 |
| 2009/0182676 A1* | 7/2009 | Barbier et al. ................... 705/75 |
| 2010/0275249 A1* | 10/2010 | McCann et al. ................... 726/5 |

FOREIGN PATENT DOCUMENTS

| | | |
|---|---|---|
| JP | 2002-140302 A | 5/2002 |
| WO | WO 00/02406 | 1/2000 |
| WO | WO 00/78009 | 12/2000 |
| WO | WO 02/05583 A1 | 1/2002 |

* cited by examiner

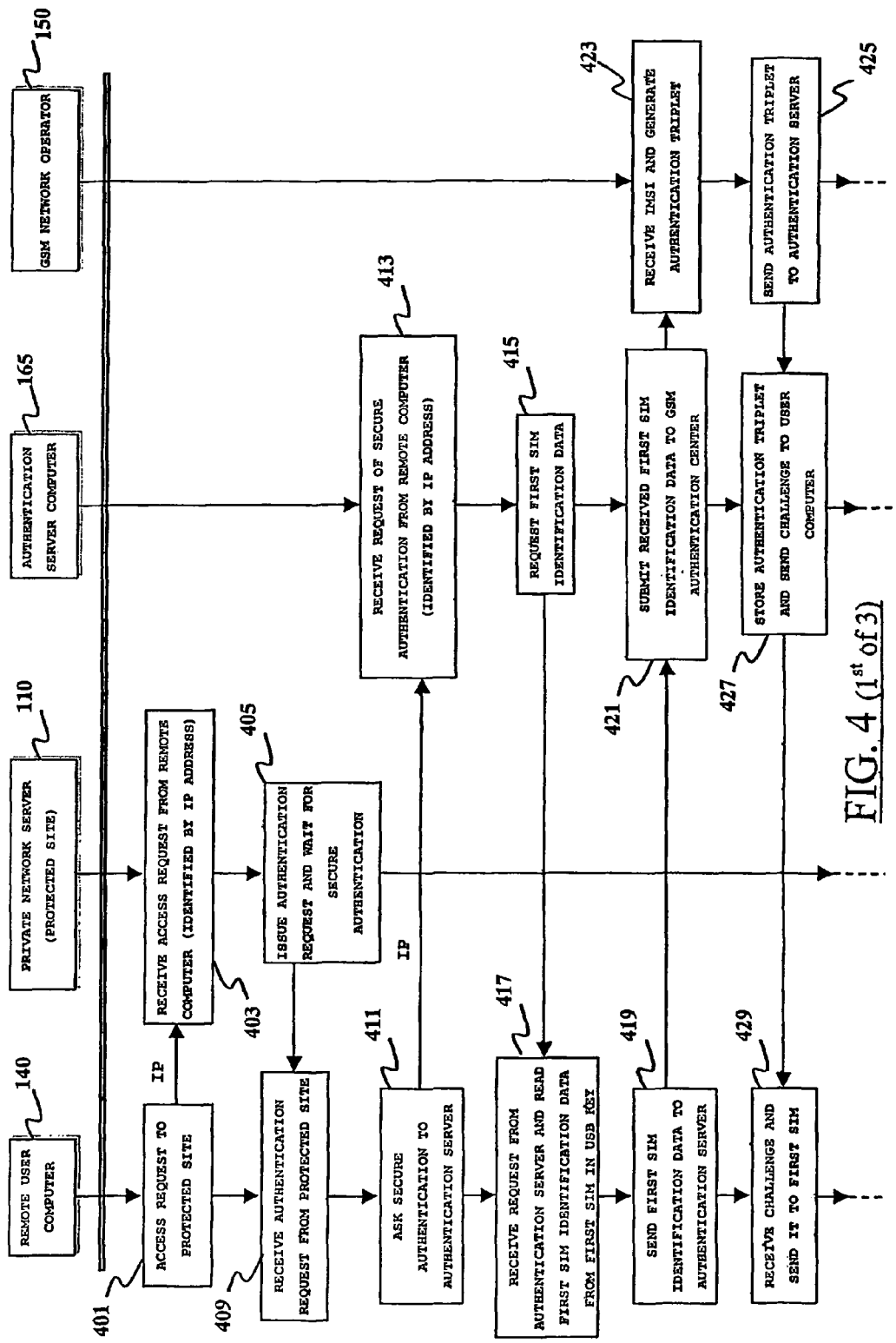
FIG. 4 (1st of 3)

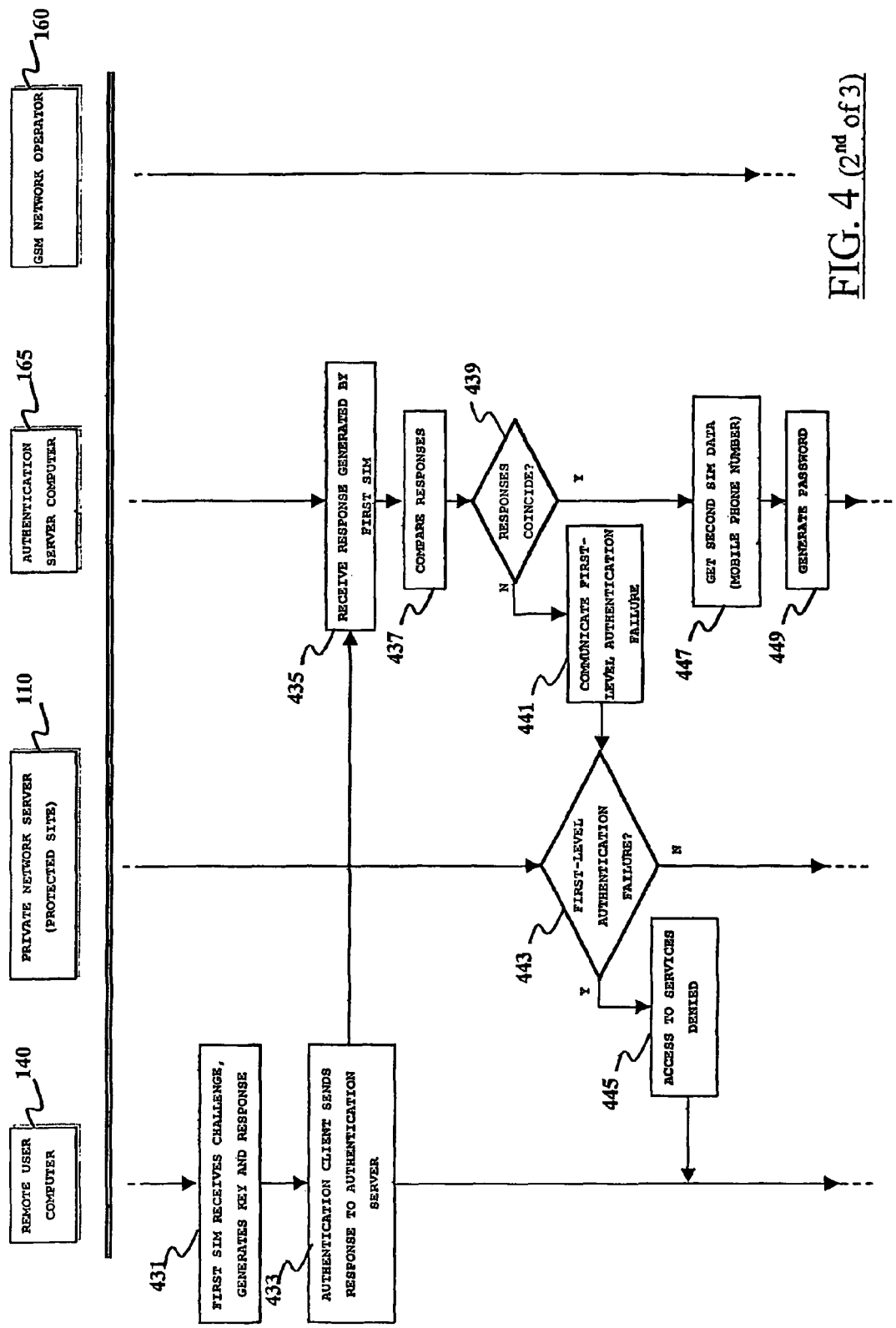
FIG. 4 (2nd of 3)

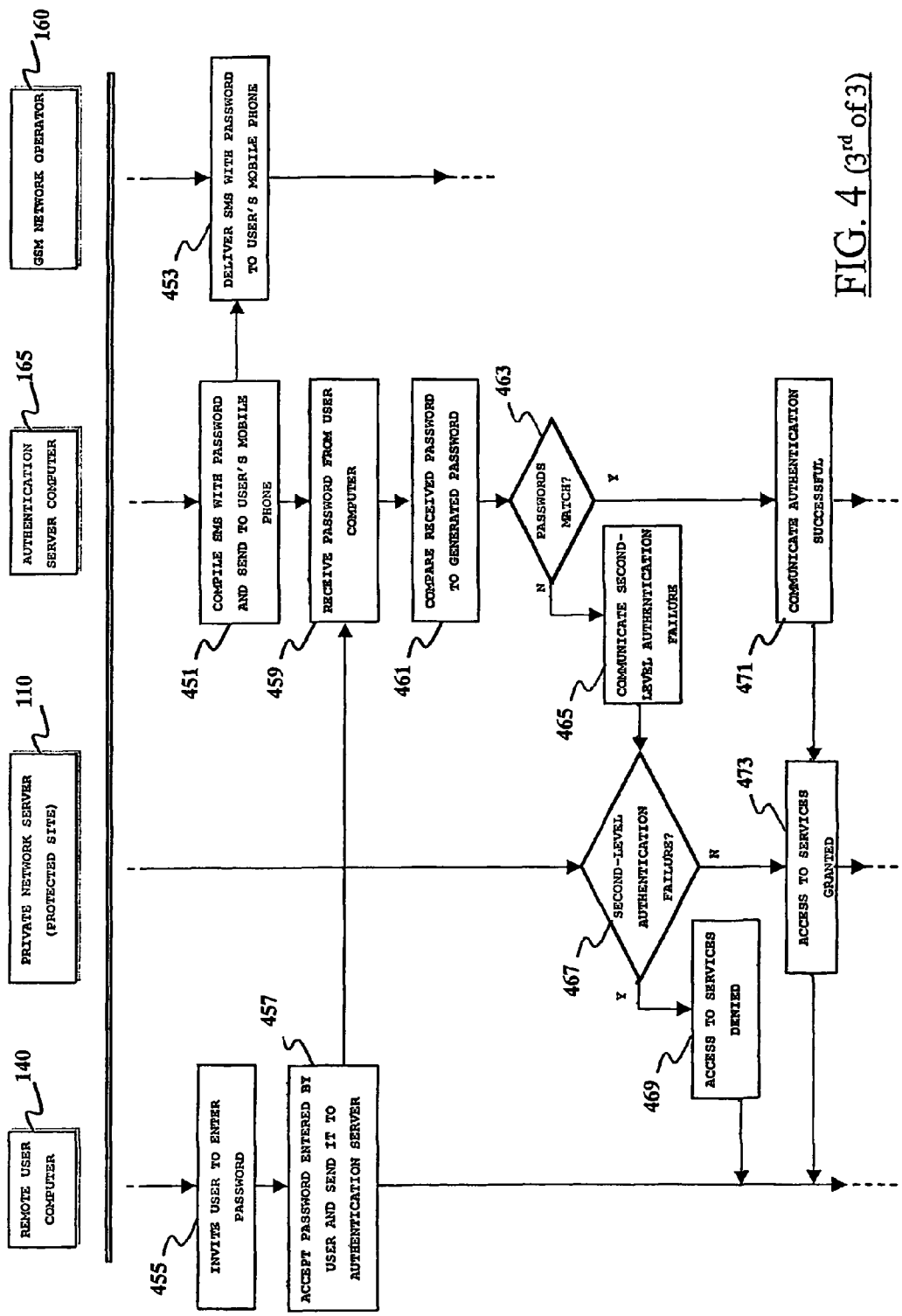
FIG. 4 (3rd of 3)

METHOD AND SYSTEM FOR THE AUTHENTICATION OF A USER OF A DATA PROCESSING SYSTEM

CROSS REFERENCE TO RELATED APPLICATION

This application is a national phase application based on PCT/EP2003/050807, filed Nov. 7, 2003, the content of which is incorporated herein by reference.

BACKGROUND OF THE INVENTION

1. Field of the Invention

The present invention generally relates to the field of data processing systems, and, more specifically, to methods of authenticating users of data processing systems.

2. Description of the Related Art

Nowadays, authenticating (i.e., verifying the identity of) users of data processing systems for the purpose of granting them the right of accessing predetermined services is a problem particularly felt.

For the purposes of the present description, the term service is to be construed broadly, so as to include any possible service that a data processing system can offer to a user, including simple log-in to a computer and/or to a computer network, connection to the intranet of a company, a public administration, a government agency, and/or to the Internet, access to an electronic messaging service, access to a Web site offering for example remote banking services (account inspection and/or placement of dispositions), access to databases and so on (this is merely a limited and not at all exhaustive list of what is meant by service in the context of the present description).

In particular, a secure authentication of the users that request access to specific services offered by a data processing system is important whenever these services involve making available to the users confidential information, such as for example the content of electronic messaging mailboxes, or personal information relating for example to the health of individuals, or research projects of a company, just to cite a few examples.

The problem of authenticating users is not only encountered on such a large scale data processing system as the Internet (which, despite its impressive success, is known to be extremely insecure), but also on a smaller scale, such as in data processing infrastructures of medium- or even small-size companies, where access to particular services such as employee payroll databases, accounting registers and the like are to be granted to the users on a selective basis.

Several authentication methods have been proposed. Probably the most widely adopted authentication solution relies on conditioning the access to predetermined services to the provision by the user of a personal identification code, typically a username and password pair.

This technique, also known as static password-based authentication, is extremely insecure, for example because the users, worried to forget the username and password assigned thereto, may write them down on, e.g., paper, rendering these personal identification codes, that should instead be kept strictly secret, potentially accessible to other people; additionally, the username and password normally travel through the data processing system without any encryption, and can thus get more or less fraudulently caught by other people, listening into the data traffic.

An improved authentication method is described in the U.S. Pat. No. 6,230,002 B1, relating to the authentication of wireless hosts associated with mobile GSM (Global System for Mobile communications) terminals. In this method, a password is generated by a Subscriber Identification Module (SIM) of a mobile GSM terminal coupled to the wireless host, and the generated password is communicated (via the GSM network) to an authentication server of a private network for gaining access to a protected site thereof.

Some of the authentication methods proposed more recently are derived from the realm of mobile phone communications systems, especially the GSM.

In all the methods of this class, use is made for the authentication of the SIM that every mobile phone includes and that stores information on the subscriber of the mobile phone communications service, particularly data used to permit the mobile phone gaining access to the GSM network.

This is for example the case of the authentication method and system described in the International application No. WO 00/02406, wherein a user of an Internet Protocol (IP) communications network (such as the Internet), wishing to get connected to the IP network via his/her IP network terminal (e.g., a Personal Digital Assistant—PDA), uses the same (or an essentially similar) SIM as used in his/her GSM mobile phone for authentication in the IP network, thereby the authentication method of an existing GSM network is utilized for authenticating in the IP network.

Other known authentication methods make use of a secure, SIM-authenticated communication channel formed by a GSM phone network for distributing passwords to users, which then use the passwords received on, e.g., their personal mobile phone for accessing services provided through a non-secure channel such as the Internet.

An example of this type of methods is provided in the United States Patent Application Publication US 2003/0061503 A1, describing an authentication method according to which when a non-authenticatable device corresponding to a user requests a service via an insecure link such as the Internet, or a Local Area Network (a LAN) or a Wireless LAN, during the log-in to the service the user identifies a secure link associated therewith, giving the personal mobile telephone number. The mobile phone of the user is then contacted, and a (preferably usable only once) password is communicated to him/her; by entering the password through the non-authenticatable device, the user is authorized to access the service.

The Applicant observes that the authentication methods known in the art, albeit satisfactory under many respects, do not however guarantee a sufficient level of authentication security.

In particular, in systems such as those according to the first two examples described above, the SIM that is used for authenticating the intended user of the data processing system services may get lost or be fraudulently subtracted to the legitimate owner, and unauthorized persons may thus have granted access to the restricted-exploitation services.

Something similar may happen in systems relying on the distribution of passwords through the GSM network: also in this case, the GSM terminal, or even only the SIM used for authenticating the user's GSM terminal in the GSM network may get lost or be fraudulently subtracted, thereby unauthorized persons may have granted access to the restricted-use services.

SUMMARY OF THE INVENTION

The Applicant feels that a higher degree of security than that achievable exploiting the known authentication techniques is desirable. It has therefore been an object of the present invention to improve the security of the known authentication methods.

The Applicant has found that an authentication method involving the exploitation of two subscriber identification modules allows achieving a very high level of security.

In particular, the Applicant has found that the level of security is highly increased if an authentication method is provided that comprises two authentication phases, namely a SIM-based authentication of a user's data processing terminal that request access to restricted services, and a second phase of verification of the user identity, carried out exploiting a secure communication network, such as a mobile communication network.

For the purposes of the present invention, by SIM-based authentication there is intended any authentication involving an exchange of identification data stored on a Subscriber Identity Module.

According to a first aspect of the present invention, there is proposed a method as set forth in appended claim 1 for authenticating a data processing terminal of a user in order to grant the data processing terminal access to selected services provided by a data processing system, the user being provided with an authenticatable mobile communication terminal adapted to be used in a mobile communication network.

Summarizing, the method comprises performing a first, SIM-based authentication of the user's data processing terminal in the data processing system at an authentication data processing server; this step comprises operatively associating with the user's data processing terminal a first Subscriber Identity Module, issued to the data processing terminal user.

The method further comprises, after having the user's mobile communication terminal authenticated in the mobile communication network, conditioning the authentication of the user's data processing terminal in the data processing system to a second authentication, based on identification information provided to the user at the mobile communication terminal through the mobile communication network.

In an embodiment of the present invention said second authentication comprises:

generating a first password at the authentication data processing server;

sending the first password to the mobile communication terminal over the mobile communication network; and checking a correspondence between the first password and a second password, depending on the first password, entered at the data processing terminal and provided to the authentication data processing server through the data processing system. The second password may be entered through the data processing terminal by the user, or automatically upon receipt of the first password at the mobile communication terminal.

Preferably, the first password is usable a limited number of times, particularly one time only.

In an embodiment of the present invention. a second subscriber identity Module is issued to the user, adapted to be used in the user's mobile communication terminal for authentication thereof in the mobile communication network. The second Subscriber Identity Module may have a fixed one-to-one relationship with the first Subscriber Identity Module, or the first Subscriber Identity Module may be associated with an identifier of the second Subscriber Identity Module, particularly a mobile communication terminal number.

In an embodiment of the present invention, said identification information is sent to the user's mobile communication terminal by way of a Short Message Service (SMS) message.

In particular, the first Subscriber Identity Module is of a type adopted in mobile communication networks for authenticating mobile communication terminals. The first, SIM-based authentication of the data processing terminal may thus comprise having the first Subscriber Identity Module authenticated by an authentication server of the data processing system, the authentication server acting substantially as an authentication center of a mobile communication network operator.

According to another aspect of the present invention, there is provided a method as set forth in claim 12, by which a data processing terminal in a data processing system is authenticated in order to be granted access to selected services provided by the data processing system.

In particular, the method comprises:

interacting with a first user's Subscriber Identity Module operatively associated with the data processing terminal and with an authentication data processing server in the data processing system, for performing a SIM-based authentication of the user's data processing terminal;

acquiring personal identification information provided to the user at a user's mobile communication terminal authenticated through a mobile communication network, and sending said personal identification information to the authentication data processing server for completing the authentication of the data processing terminal.

The first Subscriber Identity Module may be of the type adopted in mobile communication networks for authenticating mobile communication terminals.

The method may further comprise:

retrieving SIM identification data from the first Subscriber Identity Module;

communicating the retrieved SIM identification data to the authentication server, the authentication server acting substantially as an authentication center of a mobile communication network operator;

receiving from the authentication server SIM authentication data corresponding to the SIM identification data, and passing the SIM identification data to the first Subscriber Identity Module;

communicating to the authentication server a response generated by the first Subscriber Identity Module.

Also, a method as set forth in claim 16 by which an authentication data processing server authenticates a user's data processing terminal in order to grant the user's data processing terminal access to selected services provided by the data processing system.

The method comprises:

receiving a request of authentication of the data processing terminal, the data processing terminal having operatively associated therewith a first Subscriber Identity Module;

performing a SIM-based authentication of the data processing terminal based on data associated with the first Subscriber Identity Module;

providing the user with first personal identification information by exploiting a user's authenticatable mobile communication terminal authenticated in a mobile communication network, and conditioning the authentication of the user's data processing terminal to a prescribed correspondence between the first personal identification information provided to the user and second personal identification information received from the user's data processing terminal in reply to the provision of the first personal identification information.

In particular, the first Subscriber Identity Module is of a type adopted in mobile communication networks for authenticating mobile communication terminals, and the authentication data processing server acts substantially as an authentication center of a mobile communication network operator.

The method may further comprise:

generating at the authentication data processing server a first password and sending the first password over the mobile communication network to the user's mobile communication terminal; and conditioning the authentication of the data processing terminal in the data processing system to a prescribed correspondence between the first password and a second password, depending on the first password, entered at the data processing terminal and provided to the authentication data processing server through the data processing system.

Additionally, the invention encompasses computer programs directly loadable into a working memory of the user's data processing terminal and of the authentication data processing server, for performing, when executed, the above methods, as well as computer program products comprising computer readable storage media storing the computer programs.

According to still another aspect of the present invention, there is provided a system for authenticating a data processing terminal of a user so as to grant the data processing terminal access to selected services provided by a data processing system. The user has a mobile communication terminal adapted to be used, after authentication, in a mobile communication network (for example, one among a GSM, a GPRS, a UMTS network).

The system comprises:

a first Subscriber Identity Module, operatively associatable with the data processing terminal; and an authentication data processing server adapted to carry out a first authentication step based on the first Subscriber Identity Module.

The authentication data processing server is further adapted to carry out a second authentication process based on identification information provided to the user at the mobile communication terminal through the mobile communication network.

In particular, the first Subscriber Identity Module is of a type adopted in mobile communication networks for authenticating mobile communication terminals In an embodiment of the invention, a second Subscriber Identity Module is issued to the user, to be used in the mobile communication terminal for authenticating the mobile communication terminal in a mobile communication network.

The second Subscriber Identity Module may be in a fixed one-to-one relationship with the first Subscriber Identity Module, or it may be associated with an identifier of the second Subscriber Identity Module, particularly a mobile communication terminal dial-up number.

The first Subscriber Identity Module is preferably associated with a computer peripheral device connectable to the computer through a computer peripheral connection port.

According to still another aspect of the present invention, there is provided a secure authentication kit as set forth in appended claim 23, for authenticating a user's data processing terminal in a data processing system in order to grant the data processing terminal access to selected services provided by the data processing system.

The kit comprises a first Subscriber Identity Module, particularly of a type adopted in mobile communication networks for authenticating mobile communication terminals; a computer peripheral device having associated therewith the first Subscriber Identity Module and operatively associatable with the user's data processing terminal; and a second Subscriber Identity Module operatively associatable to a user's mobile communication terminal for allowing connection thereof to a mobile communication network.

The kit may also include one of the above-cited computer program products.

BRIEF DESCRIPTION OF THE DRAWINGS

The features and advantages of the present invention will be made apparent by the following detailed description of some embodiments thereof, provided merely by way of non-limitative examples, description that will be conducted making reference to the attached drawings, wherein:

FIG. 4 schematically shows, in terms of simplified flow-charts, the operation of the different elements that cooperate to implement the secure authentication method according to the cited embodiment of the invention.

DETAILED DESCRIPTION OF THE INVENTION

Figure 1:
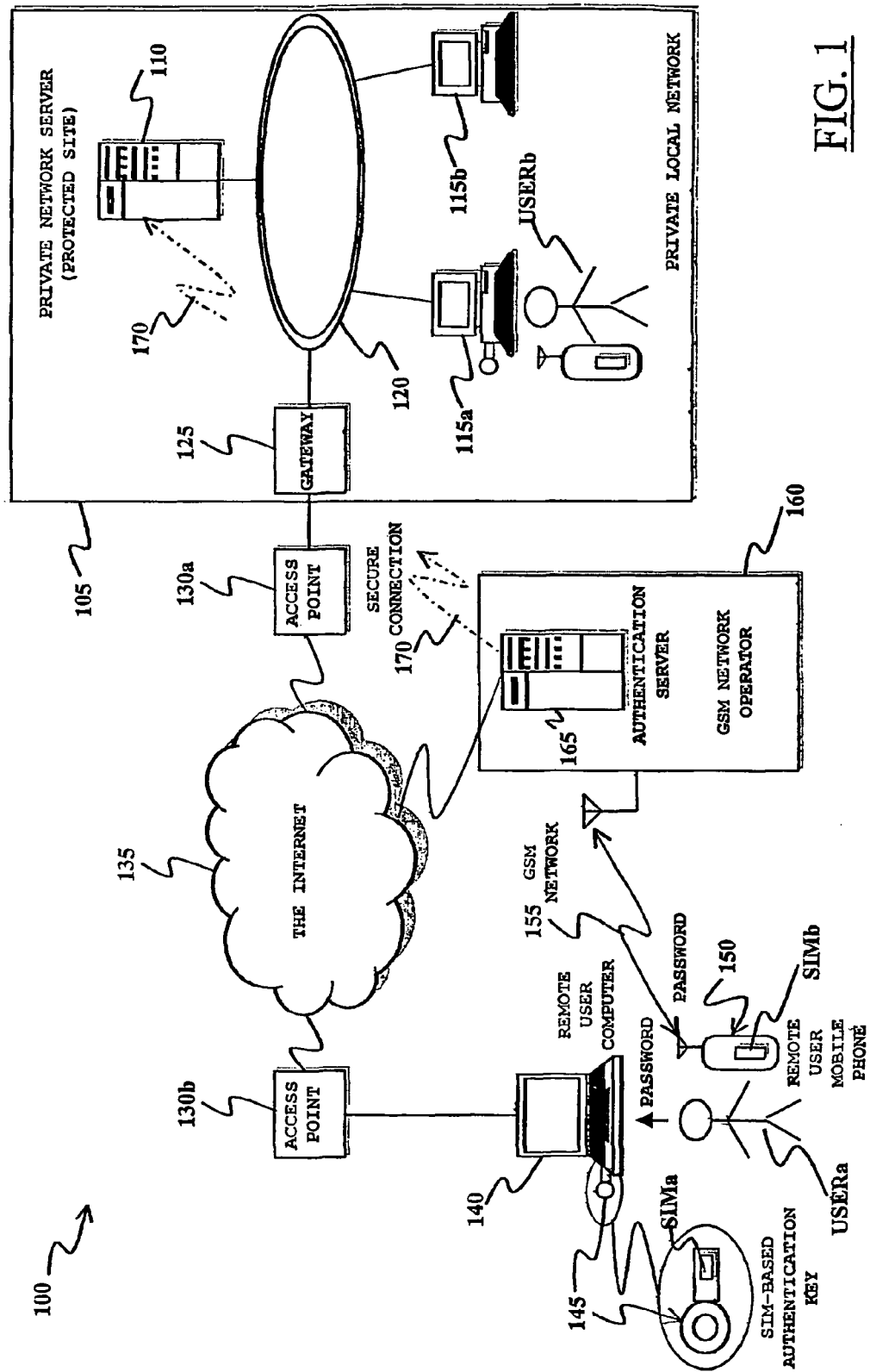
FIG. 1 pictorially shows an exemplary data processing system in which a secure user authentication method according to an embodiment of the present invention is advantageously actuated.

With reference to the drawings, a purely exemplary and not at all limitative scenario in which a secure user authentication method according to an embodiment of the present invention can be actuated is pictorially shown in FIG. 1. A distributed data processing system, globally identified by reference numeral 100, comprises a private local computer network 105, for example a Local Area Network (LAN), particularly but not limitatively an Ethernet network, a Metropolitan Area Network (MAN) or a Wide Area Network (WAN), constituting the computing infrastructure of an entity, e.g., an enterprise or a public administration agency; the specific type of local computer network 105 is totally irrelevant for the purposes of the present invention.

In extremely general terms, the private local computer network 105 comprises one or more server computers, such as the server computer 110 shown in the drawing, providing specific services to a plurality of client computers, such as the client computers 115a and 115b shown in the drawing, the different computers being connected to a data communication infrastructure 120 whereby the different computers can intercommunicate. The processing power of the different computers of the private local network 105 may vary substantially: the network client computers 115a, 115b are for example personal computers, particularly mobile computers such as laptops, or workstations, exploited by the personnel of the entity, e.g. the employees for carrying out the respective duties; the server computer 110 can be a suitably-configured personal computer, a workstation, or even a mainframe. The services provided by the server computer 110 to the client computers 115a, 115b may include storage of electronic files (file server), software application services (application server), database management services (database server), electronic messaging (electronic mail or e-mail) services (mail server), and any other possible service; albeit the specific type of service(s) provided by the server computer(s) of the private local network 105 is not relevant to the present invention, in the following, just by way of example, it will be assumed that the server computer 110 acts at least as a mail server for the private local network 105.

The private local network 105 also comprises a gateway 125, for example an ISDN (Integrated Services Digital Network) or an XDSL (Digital Subscriber Line) modem/router, interfacing the private local network 105 to an access point 130a to an external computer network 135; in the following, it will be assumed that the external computer network 135 is an open network, particularly the Internet (and thus an intrinsically insecure network), although this is not to be construed as limitative to the present invention; the access point 130a is thus for example an Internet connectivity Service Provider (ISP).

A remote user computer 140, for example a portable computer, is also connected (connectable) to the Internet 135 through an access point 130b, which can coincide with the access point (ISP) 130a or, more generally, it may be a different access point, located in a different geographic area, or the two access points 103a and 103b may be different Points of Presence (POPs) of a same ISP. To this purpose, the computer 140 exploits for example a modem (e.g., an ISDN modem) and a dial-up connection, or an XDSL modem and an XDSL connection to the access point 130b, or a Wireless LAN (WLAN) connection to the access point 130b (such as a WI-FI—WIreless-FIdelity—connection, a kind of Internet access that is becoming popular in areas such as hotels and airports).

A remote user USERa of the computer 140 is for example an employee of the enterprise owner of the private local network 105, who desires to access the private local network 105 of his/her employer and exploit the services provided by the server computer(s) 110 thereof from a remote location, i.e., without being connected to the local network 105 directly, but through the external (open) network 135; this may be for example the case of an employee which is out of the office for business or even on holidays, and who desires to access the enterprise's mail server 110 to check the personal e-mail mailbox for possible new, urgent messages.

It is assumed that in order to access the private local network 105, particularly the mail server 110, the remote user needs to make himself/herself authenticated, so as to avoid fraudulent accesses to the private e-mail mailboxes. The private local network 105 can thus be viewed as a protected-access site within the Internet. It is pointed out that this is merely an example, the authentication method which is going to be described having a very general applicability; in this respect, the remote user USERa might be any authorized user of the services provided by the private local network 105, such as a customer of the owner of the private local network 105 wishing to, e.g., inspect a status of purchase orders placed.

According to an embodiment of the present invention, for authentication purposes, the remote user USERa is provided with a pair of subscriber identification modules, particularly (albeit not limitatively) Subscriber Identity Modules (SIMs) of the type used for authentication purposes in Digital Cellular phone Systems (DCSs) or Public Land Mobile Networks (PLMNs), such as the widespread Global System for Mobile communications (GSM) cellular phone networks, or known extensions thereof such as the General Packet Radio Service (GPRS) networks (which actually is a sub-network of the GSM network), or Universal Mobile Telecommunications System (UMTS) networks (a wide-band third-generation cellular communication system), or a satellite-based mobile communication network.

As known in the art, a SIM normally takes the form of a card (credit-card size or smaller, depending on the user terminal miniaturization scale), with embedded integrated circuit components, particularly storing personalized data that support SIM's authentication, as well as encryption and decryption. At least up to now, the use of a SIM (and of the SIM-based authentication procedure) for identifying a mobile communication terminal coupled thereto has proven to be a robust way to make it impossible for other devices to impersonate that terminal, thus providing secure authenticated access to, e.g., an account corresponding to that particular user.

A first SIM SIMa of the user's SIM pair is (removably) operatively coupled to the remote user computer 140; for example, the first SIM SIMa is embedded in a computer peripheral device that can be operatively coupled to, so as to be functionally accessible by, the computer 140, for example a hardware key 145 connectable to a port (not explicitly shown in FIG. 1) of the computer 140, e.g. a Universal Serial Bus (USB) port, or a PCMCIA port thereof or by means of a peripheral of the smart-card reader type and adapted to interact with a SIM, or the first SIM SIMa may be embedded in a memory card that can then be operatively coupled to the computer 140 by means of a memory card reader. It is pointed out that the specific way in which the first SIM SIMa is operatively coupled to the computer 140 is not limitative to the present invention, being in general sufficient that the first SIM SIMa is operatively coupled to the computer 140 (in a way suitable for enabling communication between the computer 140 and the SIM SIMa) by means of any type of adapter/reader device connected to the computer 140 through any type of peripheral port.

A second SIM SIMb is (removably) inserted in a user's mobile phone/communication terminal 150, such as a mobile phone adapted to the use in a mobile communication network (for example, a PLMN) 155, such as a GSM cellular phone network, a GPRS network or a UMTS network, operated by a GSM (or GPRS, or UMTS) network operator 160.

According to an embodiment of the present invention, a one-to-one relationship exists between the first and the second SIMs SIMa and SIMb, and between the two SIMs SIMa, SIMb and the user USERa, in the sense that the authority issuing the two SIMs, normally but not strictly necessarily the GSM network operator, not only regards each of the two SIMs as associated to that particular subscriber user USERa, but additionally the two SIMs SIMa and SIMb of the SIM pair are regarded as associated with one another. It is pointed out that although in the exemplary embodiment of the invention discussed herein a unique GSM network operator 160 is considered, this is not to be construed as a limitation of the present invention: different GSM (or GPRS, or UMTS) network operators may cooperate in providing the secure user authentication service, provided that the above-cited association between the two SIMs, and between the SIM pair and the user is guaranteed.

More generally, it is sufficient that a relation is kept (in some kind of database, managed for example by the GSM network operator) between the first SIM SIMa data and an identification (typically, the telephone number) allowing to reach a user's mobile communication terminal which is coupled to the second SIM SIMb.

Also shown in the drawing is an authentication server computer 165 (more generally, an authentication data processing system, comprising for example a network of computers) managing (at least partly) a two-step user authentication procedure based on the two SIMs SIMa and SIMb, which procedure will be described in detail in the following. In extremely general terms, the authentication server computer 165 is connected to the Internet 135, and, in the shown example, it is part of the GSM network operator 160 (in which case the authentication service is one of the services provided by the GSM network operator), although in general the authentication server computer 165 is not necessarily part of, but merely communicates (over a secure communication link, such as, e.g., a Virtual Private Network) with the GSM network operator 160.

Figure 2:
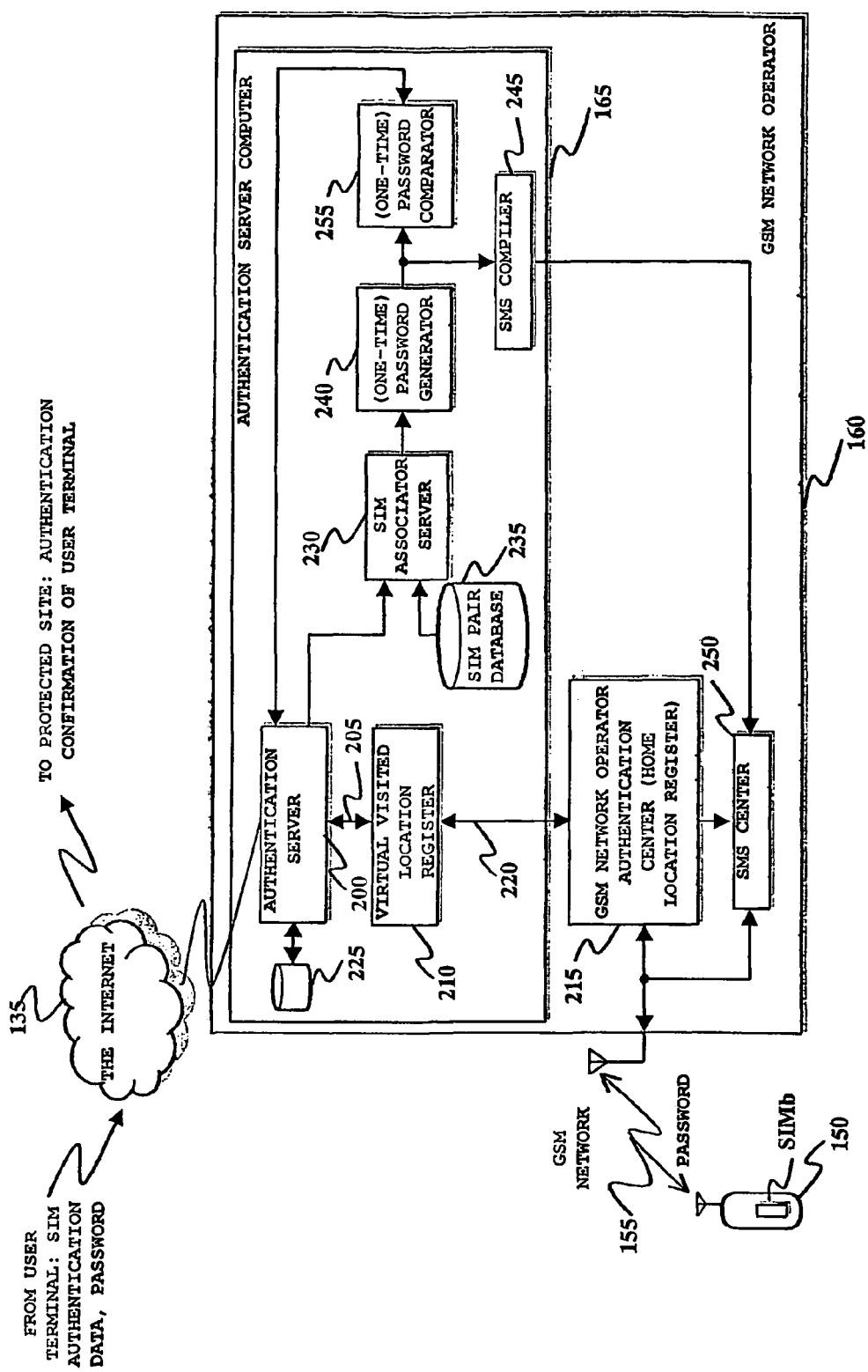
FIG. 2 schematically shows, in terms of functional blocks relevant to the understanding of the cited invention embodiment, an authentication server and a GSM network operator.

FIG. 2 schematically depicts, in terms of the functional blocks relevant to the understanding of the authentication procedure according to the invention embodiment herein described, the GSM network operator 160 and the authentication server computer 165.

The authentication server computer 165 is adapted to carry out a SIM-based authentication of the remote computer 140. As discussed in the introductory part of the present description, the SIM-based authentication mechanism of a user data processing terminal such as the remote computer 140 is known per-se, and an example of a structure allowing to implement such a mechanism is provided in the already-cited International application WO 00/02406. Without entering into specific details, the authentication server computer 165 comprises an authentication server 200 which is connected both to the Internet 135 and (through a secure connection 205) to a proxy server 210, having access to an authentication center 215 of the GSM network operator 160, which authentication center 215 is turn connected to a Home Location Register (HLR) of the GSM network operator 160. The secure connection 205 is for example ensured by the fact that the authentication server 200 is placed physically proximate to the proxy server 210. The authentication center 215 is the GSM network authentication center normally relied upon for carrying out standard authentication procedures of users' SIM-equipped mobile communication terminals (mobile phones), such as the mobile phone 150, that wish to be connected to the GSM network 155. The proxy server 210 enables a connection between the authentication server 200 and the GSM network, and in particular it routes traffic between the authentication server 200 and the GSM authentication center 215; the proxy server 210 acts as a virtual Visitor Location Register (VLR), appearing to the HLR of the GSM network operator as any other VLR of the GSM network. The communications 220 between the proxy server 210 and the GSM authentication center 215 may take place over the standardized SS7 signaling network utilized by the GSM network operator. Associated with the authentication server 200 is a database 225, used for storing user authentication data during the authentication procedure.

The authentication server computer 165 also includes a SIM associator server 230, which, in connection with a SIM pair database 235 storing information on the pairs of SIMs such as the SIM pair SIMa and SIMb (or, more simply, the identification, e.g., the mobile telephone number corresponding to the second SIM SIMb which is associated with the first SIM SIMa), is capable of identifying one SIM of a given SIM pair, for example the second SIM SIMb (ore the mobile telephone number corresponding thereto), based on information identifying the other SIM, in this example the first SIM SIMa, provided by the authentication server 200. The SIM associator server 230 communicates with a password generator agent 235, generating passwords (preferably, one-time usable) to be sent over the GSM network 155 to the user's mobile phone 150, for example in the form of a Short Message Service (SMS) message, prepared by an SMS compiler agent 245. The message is delivered to the intended recipient by a messaging service center 250 of the GSM network operator 160 for example an SMS center, or a Multimedia Messaging Service (MMS) center, for distributing text or multimedia messages to subscribers' terminals of the GSM network 155. Alternatively, the passwords may be sent in the form of MMS, or they can be communicated to the user via phone calls, for example exploiting a voice synthesizer. A password comparator agent 255 is provided for comparing the passwords generated by the password generator agent 240 to corresponding reply passwords, entered by the user and received over the Internet 135, for example by means of the authentication server 200.

It is pointed out that at least some of the functional blocks of the authentication server computer 165 described in the foregoing may be and, normally, would be implemented as a mix of hardware and software, or even totally as software.

Figure 3:
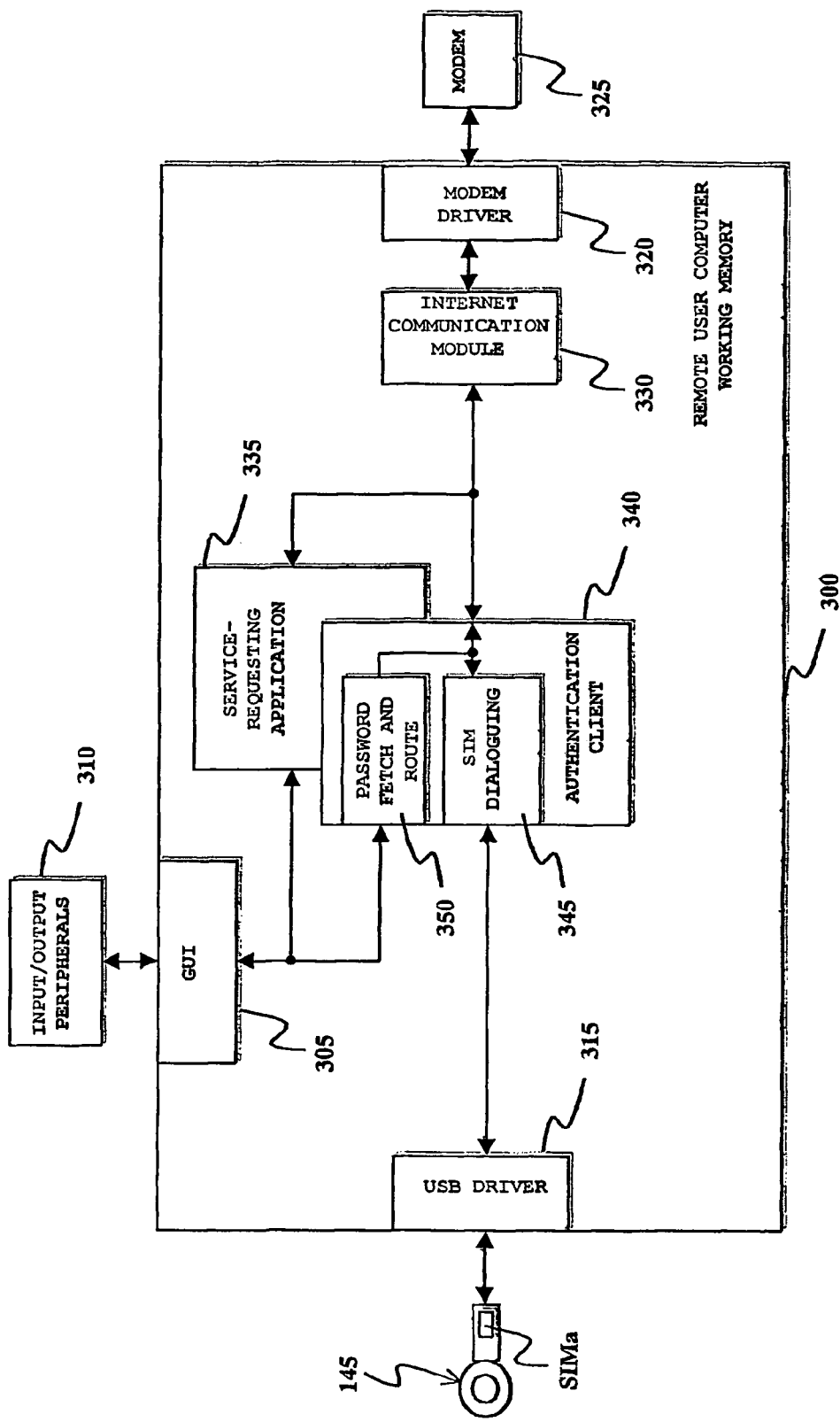
FIG. 3 schematically shows, in terms of functional blocks, a content of a working memory of a user computer during an authentication phase carried out actuating the secure authentication method according to the cited invention embodiment.

FIG. 3 is a simplified, schematic pictorial view of the content of a working memory 300 (e.g., a RAM) of the remote computer 140 during the authentication process. A Graphical User Interface (GUI) software module 305 allows an easy interaction of the user USERa with the computer 140, through conventional computer input/output peripherals, schematized as a block 310 and including a monitor, a keyboard, a pointing device. A USB driver software module 315 enables the interaction with USB peripherals, in this example the USB key 145 with embedded therein the first SIM SIMa. A modem driver software module 320 enables communicating with a modem 325 (e.g., ISDN or XDSL), used for the connection to the access point 130*b*; the modem driver module manages the low-level details of the communication. An Internet communication software module 330 manages instead the higher-level details of the communication over the Internet, for example details relating to the Internet Protocol (IP). Block 335 schematizes a software application running on the computer 140 and that is supposed to have requested services to a protected site providing selective access to the services, conditioned on a preliminary authentication of the user; for example, the application 335 is an e-mail client software (for example, Outlook or Outlook Express by Microsoft, Eudora, LotusNotes) that the user USERa of the computer 140 has launched for accessing the personal e-mail mailbox held by the mail server 110. Block 340 schematizes instead an authentication client software application that is invoked at the computer 140, for example in reply to an authentication request from the mail server 110, so as to manage those part of the authentication procedure local to the computer 140, as described in detail in the following. Schematically, the authentication client 340 comprises a SIM dialoguing agent 345, for dialoguing with the SIM SIMa in the USB key 145, and a password fetch and route module 350, for fetching an, e.g., user-inputted password, inputted via, e.g., the keyboard, and routing the inputted password to the communication module 330, so as to cause the password be sent to the authentication server computer 165 over the Internet 135.

It is observed that all the software modules are preliminary installed on the computer 140, and, when invoked, operate on top of a computer operating system, not explicitly schematized in the drawing. In particular, the authentication client software 340, which may be installed either from a physical support, such a floppy disk, a CD-ROM or DVD-ROM, or by downloading it from a suitable file server (e.g., by means of an FTP session), may in some cases take the form of a plug-in for an already existing service-requesting application 335, e.g. a plug-in for a mail client such as Microsoft Outlook, Microsoft Outlook Express, Eudora, Lotus Notes, or for a browser such as Microsoft Internet Explorer or Netscape Communicator.

Herein below, an exemplary authentication procedure according to an embodiment of the present invention will be described with the aid of the flowcharts of FIG. 4, considering the scenario outlined so far.

Let it be assumed that the user USERa, at a remote location from the private local network 105 of the employer, wishes to connect to the mail server 110 for checking the personal electronic mailbox. The user USERa establishes a connection to the Internet 135 (through the access point 130b), then launches the e-mail client 335, which tries to access the mail server 110 in the private local network 105 (the protected site—block 401 in FIG. 4). The mail server 110 receives the access request (block 403), and, before granting access to the (e-mail client 335 running in the) remote computer 140, starts the authentication procedure by issuing an authentication request to the computer 140. Then, the mail server 110 waits for an authentication confirmation (block 405), to be received from the authentication server computer 165.

The authentication procedure is comprised of two authentication phases: a first authentication phase provides for a SIM-based authentication of the computer 140, carried out relying on the authentication method exploited in the GSM network 155 for authenticating users' mobile phones. Once the computer 140 has been authenticated, a second authentication phase provides for authentication (personal identification or recognition) of the user USERa of the computer 140.

In order to understand the details of the SIM-based authentication procedure of the computer 140, it is useful to briefly review how mobile phones are normally authenticated in a GSM network.

When a user's mobile phone, for example the mobile phone 150 of the user USERa, tries to connect to a GSM network, such as the GSM network 155, the authentication center 215 of the GSM network operator 160 asks the mobile phone 150 to provide the respective International Mobile Subscriber Identity (IMSI), which is a nine-byte identifier code stored on the mobile phone SIM SIMb. In reply, the mobile phone 150 provides to the GSM network operator 160 the requested IMSI identifier code. The authentication center 215 uses the received. IMSI code for generating a so-called authentication triplet, made up of a "challenge", a "signed response" and an encryption key; the challenge is a sixteen-byte random value, the encryption key is the connection-specific encryption key used in the GSM network 155, and the signed response (hereinafter, simply response) is a four-byte value which is derived from the challenge using the specific encryption key. The authentication center 215 then sends the challenge to the mobile phone 150; based on the challenge received from the authentication center 215, the phone's SIM SIMb generates a response and an encryption key: the key is stored in the SIM SIMb, while the response is transmitted back to the authentication center 215. The authentication center 215 compares the received response to the locally-generated one (the signed response generated in the triplet generation process), and if the two responses coincide, the authentication of the SIM SIMb is successfully completed.

Coming back to FIG. 4, the remote computer 140 receives the authentication request from the mail server 110 (block 409); this causes the authentication client 340 to be invoked, for example by means of a script included in a Web page downloaded to the remote computer 140 when the latter contacts the mail server 110, and the connection of the remote computer 140 to the mail server 110 to be redirected to the authentication server 200 in the authentication server computer 165; the remote computer 140 thus contacts the authentication server 200 and provides thereto the IP address thereof, asking the authentication server 200 to securely authenticate the user USERa (and to give confirmation of the authentication to the mail server 110) (block 411). The authentication server 200 receives the request for authentication from the computer 140, together with the IP address thereof, which will be used to identify the computer 140 to the mail server 110 (block 413).

The SIM-based authentication of the computer 140 (first phase of the authentication procedure) is similar to the previously explained authentication of the mobile phone 150 for the connection to the GSM network 155, except that in this case data partially travel over the Internet 135 (more generally, an open computer network), and not only over the GSM network 155.

The authentication server 200 issues (block 415) to the computer 140 a request for identification data of the first SIM SIMa of the authentication SIM pair, namely the SIM operatively coupled to the computer 140. The authentication client 340 receives the request and then accesses the first SIM SIMa embedded in the USB key 145 for reading therefrom identification data, such as the IMSI (block 417). If the authentication client 340 cannot find any SIM attached to the computer 140, a message can be generated to the user USERa asking for connecting the SIM-carrying peripheral to the computer 140, or for inserting the first SIM SIMa into a suitable reader. The authentication client 340 then sends the identification data read from the first SIM SIMa to the authentication server 200 (block 419).

In order to authenticate the first SIM SIMa, the authentication server 200 submits the first SIM identification data received from the computer 140 to the GSM authentication center 215 at the premises of the GSM operator 150 (block 421). To this purpose, the virtual VLR 210 is exploited for establishing a connection between the authentication server 200 and the GSM authentication center 215. The authentication server 200 sends to the virtual VLR 210 an authentication request message, containing the identification data (the IMSI) of the first SIM SIMa to be authenticated, as received from the computer 140. The virtual VLR 210 sends to the GSM authentication center 215 a suitably-formatted inquiry message (for example, a message according to the Mobile Application Part—MAP—protocol), for requesting the GSM authentication center 215 to issue an authentication triplet. The GSM authentication center 215 receives the inquiry message containing the IMSI of the first SIM SIMa, and replies generating (block 423) and sending (block 425) to the virtual VLR 210 in the authentication server computer 165 an authentication triplet, totally similar to those used for registering mobile phones to the GSM network 155 and made up of a challenge, a response and an encryption key. The authentication triplet is sent by the virtual VLR 210 to the authentication server 200, which stores the authentication triplet (block 427) and, from now on, acts in respect of the first SIM SIMa just as the GSM authentication center 215 would act in respect of a mobile phone to be authenticated. The challenge is sent over the Internet 135 to the computer 140 (block 427), wherein the authentication client 340 routes the received challenge to the first SIM SIMa (block 429).

When the first SIM SIMa receives the challenge, it generates an encryption key and a response (block 431); the encryption key is stored at the first SIM SIMa or at the authentication client 340 (for example to be used for encrypting future communications over the Internet with the protected site), and the generated response is sent back by the authentication client 340 to the authentication server 200 (block 433).

When the authentication server 200 receives from the authentication client 340 the response generated by the first SIM SIMa (block 435), the response received is compared to the response built in the authentication triplet (block 437). If the two responses do not coincide (exit branch N of decision block 439), the authentication server 200 informs the protected site 110 (exploiting the IP address of the remote computer 140) that the first-level authentication failed (block 441); if the private network server 110 receives such a message (block 443, exit branch Y), it denies access of the user computer 140 (identified by the respective IP address) to the services (block 445). If instead the two responses coincide (exit branch Y of decision block 439), the SIM associator server 230 in the authentication server computer 165 retrieves from the SIM pair database 235 identification information of the second user's SIM SIMb, which is associated with the first user's SIM SIMa (block 447); for example, the mobile phone number corresponding to the second SIM SIMb is identified, so as to enable contacting the user by the user's mobile phone 150. The password generator agent 240 then generates the password to be sent to the remote user USERa through the personal mobile phone 150 (block 449). The SMS message compiler 245 then compiles an SMS message to be sent to the mobile phone 150 of the user USERa, containing the generated password, and sends the message to the user's mobile phone 150 (block 451); the SMS center 240 of the GSM operator 160 delivers the SMS message to the user's mobile phone 150 (block 453).

In parallel, the authentication client 340 causes an invitation message to be displayed to the user USERa of the computer 140 for inviting him/her to enter the password received over the personal mobile phone 150 (block 455). Conditioned to the fact that the user's mobile phone 150 has preliminary been registered to the GSM network (in the conventional way outlined in the foregoing), the SMS message from the authentication server computer 165 with the password to be used for completing the authentication procedure is received at the user's mobile phone 150. In an embodiment of the present invention, the SMS message is encrypted, for increased security.

When the user USERa receives the password, he/she enters the password in the computer 140, and the authentication client 340 accepts the entered password and sends it to the authentication server 200, over the Internet (block 457). It is pointed out that it is not strictly necessary that the password entered by the user coincides with the password received at the mobile phone: the user can in fact be provided with a scrambling device (for example, a transcode table), by which for any password received, a scrambled password can be derived.

The password is received at the authentication server 200 (block 459), and it is compared by the password comparator agent 255 to the locally-originated password (block 461). If the two passwords do not match (exit branch N of decision block 463), the authentication server 200 informs the protected site server 110 that the second-level authentication failed (block 465); if the private network server 110 receives such a message (block 467, exit branch Y), it denies access of the user computer 140 to the services (block 469). If instead the two responses coincide (exit branch Y of decision block 463), the authentication of the user USERa is successful, and the authentication server 200 informs the protected site server 110 that the user USERa, uniquely identified with that specific IP address has successfully authenticated (block 471). In order to prevent any fraud, this authentication confirmation of the authentication server 200 to the protected site 110 may be communicated through a secure connection 170 (represented in dash-and-dot), or be encrypted; for example, a Virtual Private Network (VPN) may be set up between the protected site server requesting the authentication and the authentication server.

When the protected site server 110 receives such a confirmation, it grants access to the services (block 473), allowing for example the e-mail client 335 to access the personal mailbox of the user USERa. From now on, the authenticated user USERa can exploit the services offered by the server 110.

It is pointed out that instead of exploiting the IP address of the remote computer 140 as a way to identify the computer at the protected site and the authentication server (a solution that may in some cases pose some problems, such as in the case the computer 140 connects to the Internet passing through a proxy server, or, in general, whenever the connection is made through a device filtering the IP addresses), different solutions may be adopted, relying for example on an exchange of identification data at a higher level with respect to the IP level, for example an application level.

It can be appreciated that the authentication procedure described in the foregoing relies on a two-step authentication process: a first, SIM-based authentication procedure for authenticating the remote computer 140, and a second authentication procedure, still relying on a SIM authentication (the authentication of the user's mobile phone for the connection to the GSM network), by which the identity of the user is ensured (in order to have granted access, a fraudulent user should not only get in possession of the first SIM SIMa, but also of the second SIM SIMb, which occurrence is considered to be very unlikely). Also, the password (preferably one-time usable) necessary for completing the authentication is communicated to the user over an authenticated and secure link such as the GSM network; for an even increased security, encryption of the password may be provided for. Furthermore, a Personal Identification Number (PIN) code could be requested to the user, in order to gain access to the first SIM SIMa associated to the computer 140, to even improve security.

As mentioned already, the GSM authentication center relied upon for authenticating the first SIM SIMa needs not necessarily be the same GSM authentication center authenticating the second SIM SIMb, provided the relationship between the two SIMs is guaranteed.

In order to increase security of the transactions, the data exchanged between the computer 140 and the protected site server 110, once the authentication has been completed and access to the desired services is granted may be encrypted, for example using the same encryption key generated by the first SIM SIMa.

The Applicant points out that the secure, two-step authentication method according to the present invention has a very wide applicability, not being limited to the exemplary scenario considered herein. For example, the method can be exploited not only for authenticating a remote user accessing the private local network 105 through the Internet, but even via a direct, dial-up connection to the private local network.

The secure authentication method according to the present invention can be exploited even in case access to the private local network does not occur via an insecure, open network such as the Internet, but the user computer is within and connected directly to the network 105, for making secure a normal user log-in: in this case, the external network may be involved merely for the purpose of communicating with the authentication server computer 165. This situation is schematically depicted in FIG. 1, wherein reference numeral USERb denotes a local user of the private local network 105, e.g. an employee of the enterprise owner of the private local network 105, who wishes to log in to the network through one of the computers thereof, for example the client computer 110a, so as to exploit the services made available by the enterprise's data processing system (among which services, connectivity to the Internet 135 may be included). Just like the remote user USERa, also the user USERb is provided with a pair of SIMs: a first SIM (embedded for example in a USB key adapted to be read by the computer 110a) for the SIM-based authentication of the computer opening the session, and a second SIM to be used in a conventional user mobile phone, for receiving, over the mobile phone network, the password from the authentication server computer 165.

It is also observed that albeit in the scenario considered herein the authentication server computer was outside the data processing environment requesting authentication, and particularly a part of the GSM network operator, this is not to considered as limitative to the present invention; as a matter of fact, the authentication server computer or system of computers may be part of the data processing system of, e.g., the enterprise implementing the secure authentication method of the present invention.

The authentication method according to the present invention is particularly adapted to ensure a high degree of security in the transactions carried out by employees of an enterprise or a government agency. Thus, the authentication method according to the present invention provides a suitable way for managing an enterprise or agency security in connection with the personnel thereof.

However, this application of the authentication method is not limitative; for example, the method can be used for authenticating customers of e-commerce Internet sites.

It is also pointed out that although in the exemplary embodiment described in the foregoing the (one-time) password is received by the user on the personal mobile phone, and the user has to enter the password personally into the computer 140, this is not to be considered a limitation of the present invention; nothing prevents in fact from providing that the password received through the GSM network is automatically entered into the computer, for example by operatively connecting the user's mobile phone 150 to the user's computer 140, e.g., by a Bluetooth or similar connection.

In conclusion, the present invention has been herein disclosed and described by way of some embodiments, and some alternatives have been set forth, but it is apparent to those skilled in the art that several modifications to the described embodiments, as well as other embodiments of the present invention are possible without departing from the scope thereof as defined in the appended claims.

The invention claimed is:

1. A method of authenticating a data processing terminal of a user for granting the data processing terminal access to selected services provided by a data processing system, the user being provided with an authenticatable mobile communication terminal adapted to be used in a mobile communication network, comprising:
performing a first, SIM-based authentication of the user's data processing terminal in the data processing system at an authentication data processing server, said performing the SIM-based authentication comprising operatively associating with the user's data processing terminal a first subscriber identity module issued to the data processing terminal user;
having the user's mobile communication terminal authenticated in the mobile communication network; and
conditioning the authentication of the user's data processing terminal in the data processing system to a second authentication, said second authentication being based on identification information provided to the user at the mobile communication terminal through the mobile communication network using a second subscriber identity module.

2. The method according to claim 1, wherein said second authentication comprises:
generating a first password at the authentication data processing server;
sending the first password to the mobile communication terminal over the mobile communication network; and
checking a correspondence between the first password and a second password, depending on the first password, entered at the data processing terminal and provided to the authentication data processing server through the data processing system.

3. The method according to claim 1, comprising issuing to the user the second subscriber identity module adapted to be used in the user's mobile communication terminal for authentication thereof in the mobile communication network.

4. The method according to claim 1, wherein said identification information is sent to the user's mobile communication terminal by way of a short message service message.

5. The method according to claim 1, wherein said first subscriber identity module is of a type adopted in mobile communication networks for authenticating mobile communication terminals.

6. The method according to claim 2, comprising having the user entering the second password through the data processing terminal.

7. The method according to claim 2, wherein the second password is entered automatically upon receipt of the first password at the user's mobile communication terminal.

8. The method according to claim 2, wherein said first password is usable a limited number of times, or one time only.

9. The method according to claim 3, wherein the second subscriber identity module has a fixed, one-to-one relationship with the first subscriber identity module.

10. The method according to claim 3, wherein the first subscriber identity module is associated with an identifier of the second subscriber identity module, or a mobile communication terminal number.

11. The method according to claim 5, wherein said performing the first, SIM-based authentication of the data processing terminal comprises having the first subscriber identity module authenticated by an authentication server of the data processing system, the authentication server acting substantially as an authentication center of a mobile communication network operator.

12. A method by which a data processing terminal in a data processing system is authenticated in order to be granted access to selected services provided by the data processing system, the method comprising:
interacting with a first user's subscriber identity module (SIM) operatively associated with the data processing terminal, and with an authentication data processing server in the data processing system, for performing a SIM-based authentication of the user's data processing terminal;
acquiring personal identification information provided to the user at a user's mobile communication terminal for a second authentication, wherein the second authentication is through a mobile communication network using a second subscriber identity module; and
sending said personal identification information to the authentication data processing server for completing the authentication of the data processing terminal.

13. The method of claim 12, in which the first subscriber identity module is of a type adopted in mobile communication networks for authenticating mobile communication terminals.

14. The method of claim 13, further comprising:
retrieving SIM identification data from the first subscriber identity module;
communicating the retrieved SIM identification data to the authentication server, the authentication server acting substantially as an authentication center of a mobile communication network operator;
receiving from the authentication server SIM authentication data corresponding to the SIM identification data, and passing the SIM identification data to the first subscriber identity module; and
communicating to the authentication server a response generated by the first subscriber identity module.

15. A method by which an authentication data processing server authenticates a user's data processing terminal in a data processing system in order to grant the data processing terminal access to selected services provided by the data processing system, comprising:
receiving a request of authentication of the data processing terminal, the data processing terminal having operatively associated therewith a first subscriber identity module;
performing a SIM-based authentication of the data processing terminal based on data associated with the first subscriber identity module;
providing the user with first personal identification information by exploiting a user's mobile communication terminal authenticated in a mobile communication network; and
conditioning the authentication of the user's data processing terminal to a prescribed correspondence between the first personal identification information provided to the user and second personal identification information received from the user's data processing terminal through the mobile communication network using a second subscriber identity module in reply to the provision of the first personal identification information.

16. The method according to claim 15, wherein the first subscriber identity module is of a type adopted in mobile communication networks for authenticating mobile communication terminals, the authentication data processing server acting substantially as an authentication center of a mobile communication network operator.

17. The method according to claim 16, further comprising:
generating at the authentication data processing server a first password and sending the first password over the mobile communication network to the user's mobile communication terminal; and
conditioning the authentication of the data processing terminal in the data processing system to a prescribed correspondence between the first password and a second password, depending on the first password, entered at the data processing terminal and provided to the authentication data processing server through the data processing system.

18. In a data processing system, a system for authenticating a data processing terminal of a user so as to grant the data processing terminal access to selected services provided by the data processing system, the user having an authenticatable mobile communication terminal adapted to be used in a mobile communication network, comprising:
a first subscriber identity module operatively associatable with the data processing terminal; and
an authentication data processing server adapted to carry out a first authentication step based on the first subscriber identity module;
the authentication data processing server being further adapted to carry out a second authentication process based on identification information provided to the user at the mobile communication terminal through the mobile communication network using a second subscriber identity module.

19. The system according to claim 18, wherein the first subscriber identity module is of a type adopted in mobile communication networks for authenticating mobile communication terminals.

20. The system according to claim 18, wherein said first subscriber identity module is associated with a device connectable to the computer through a computer peripheral connection pot.

21. The system according to claim 18, wherein said mobile communication network is one among a GSM, a GPRS, and a UMTS network.

22. The system according to claim 19, wherein the second subscriber identity module is used in the mobile communication terminal for authenticating the mobile communication terminal in a mobile communication network.

23. The system according to claim 22, wherein the second subscriber identity module is in a fixed, one-to-one relationship with the first subscriber identity module.

24. The system according to claim 22, wherein the second subscriber identity module is associated with an identifier of the second subscriber identity module, particularly a mobile communication terminal number.

25. An authentication system for authenticating a user's data processing terminal in a data processing system in order to grant the data processing terminal access to selected services provided by the data processing system, comprising:
a first subscriber identity module;
a hardware computer peripheral device having associated therewith the first subscriber identity module and operatively associatable with the user's data processing terminal for performing a first, SIM-based authentication of the user's data processing terminal in the data processing system at an authentication data processing server; and
a second subscriber identity module operatively associated with a user's mobile communication terminal for allowing connection thereof to a mobile communication network and conditioning the authentication of the user's data processing terminal in the data processing system to a second authentication, said second authentication being based on identification information provided to the user at the mobile communication terminal through the mobile communication network using the second subscriber identity module.

26. The authentication system according to claim 25, wherein the first subscriber identity module is of a type adopted in mobile communication networks for authenticating mobile communication terminals.

* * * * *